United States Patent [19]

Groff

[11] Patent Number: 4,536,147

[45] Date of Patent: Aug. 20, 1985

[54] FOOD PROCESSING APPARATUS

[76] Inventor: Edwin T. Groff, 120 S. Third Ave., West Reading, Pa. 19611

[21] Appl. No.: 626,239

[22] Filed: Jun. 29, 1984

[51] Int. Cl.³ .............................................. A21C 3/06
[52] U.S. Cl. ................................. 425/323; 425/166; 425/375; 425/377; 425/146
[58] Field of Search .............. 425/87, 166, 208, 224, 425/319, 323, 375, 377, 458, 503, 146, 156, 174.4; 264/167

[56] References Cited

U.S. PATENT DOCUMENTS

| | | | |
|---|---|---|---|
| 1,268,003 | 5/1918 | Granlund | 425/208 |
| 2,429,042 | 10/1947 | Bader | 425/319 X |
| 2,742,000 | 4/1956 | Hansen et al. | 425/375 |
| 3,407,440 | 10/1968 | Myers | 425/319 |
| 3,494,304 | 2/1970 | Gugler | 425/323 |
| 3,632,463 | 1/1972 | McFarlane | 425/174.4 X |
| 3,940,226 | 2/1976 | Verhoeven | 425/375 |
| 4,389,357 | 6/1983 | Chu et al. | 425/166 X |
| 4,478,569 | 10/1984 | Giulio et al. | 425/375 X |

FOREIGN PATENT DOCUMENTS 1036783 8/1958 Fed. Rep. of Germany ...... 425/323

*Primary Examiner*—J. Howard Flint, Jr.
*Attorney, Agent, or Firm*—Robert K. Youtie

[57] ABSTRACT

A food processing apparatus having an extrudate outlet nozzle, an extrudate receiver, the nozzle and receiver being movable to discharge extrudate in a preselected two dimensional line configuration on the receiver, and a programmable controller for controlling the movement to achieve the configuration.

13 Claims, 6 Drawing Figures

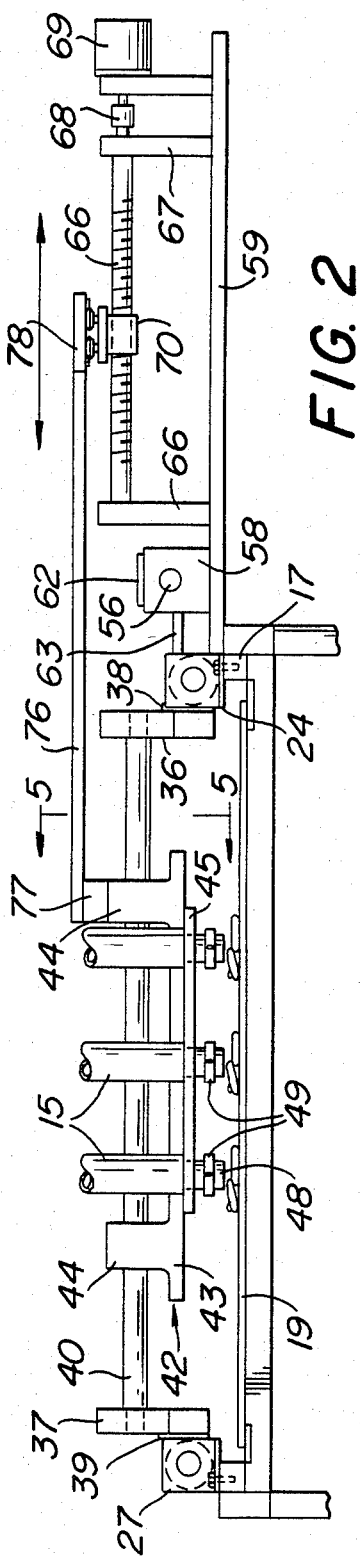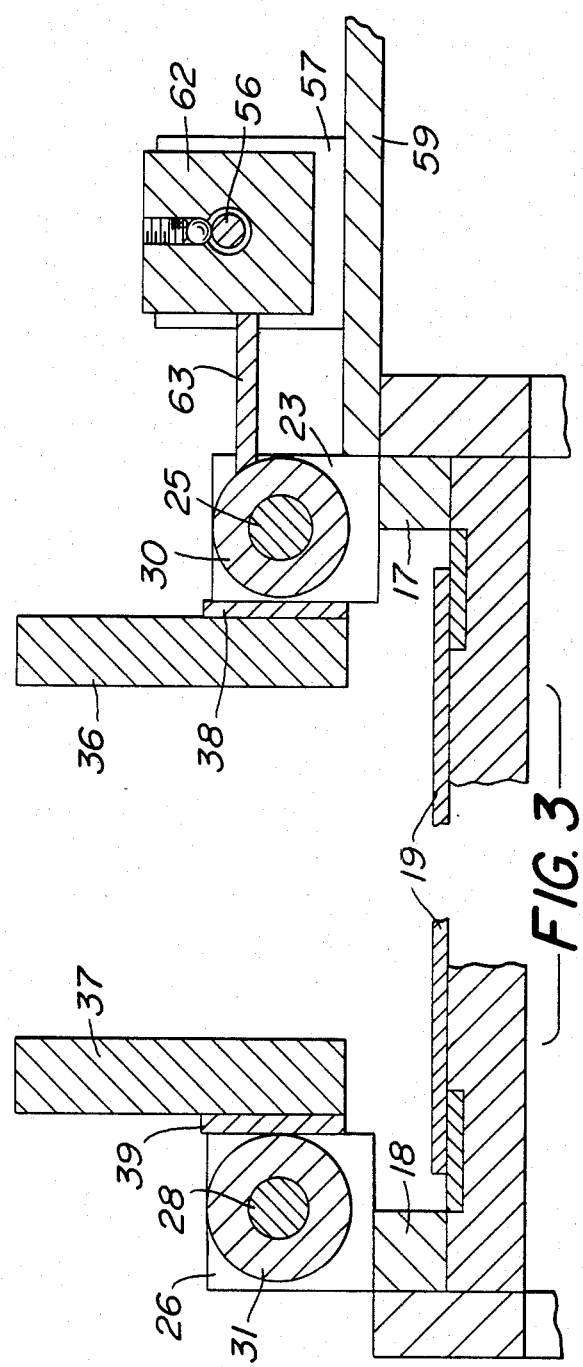

FOOD PROCESSING APPARATUS

BACKGROUND OF THE INVENTION

It is well known in the food processing art to extrude a comestible paste, or the like, however such prior art teachings are generally limited in the relative motion available between the extruder outlet and extrudate receiver. For example, it is known in the prior art to rotate an extruder orifice about an eccentric axis, and to cam control extruder orifice motion. Applicant is aware of the below listed prior art:

| U.S. PAT. NO. | PATENTEE |
| --- | --- |
| 1,268,003 | Granlund |
| 2,429,042 | Bader |
| 3,407,440 | Myers, Jr. |

SUMMARY OF THE INVENTION

It is an important object of the present invention to provide an extruding apparatus for comestible paste which overcomes the above-mentioned difficulties, adapted for substantially universal relative motion in two dimensions between the extruder orifice and extrudate receiver, and which is extremely simple in construction and operation, for extreme versatility throughout a long useful life.

While the apparatus of the present invention has been primarily developed and employed for use in producing pretzels, and will be illustrated and described hereinafter with particular reference thereto, it is appreciated that the instant device is capable of advantageous utilization in the production of a wide variety of extrudable food products, all of which uses are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 2 is a partial front elevational view of the apparatus of FIG. 1.

FIG. 3 is a sectional elevational view taken generally along the line 3—3 of FIG. 1, enlarged, and with parts broken away.

DESCRIPTION OF THE PREFERRED EMBODIMENT

Figure 1:
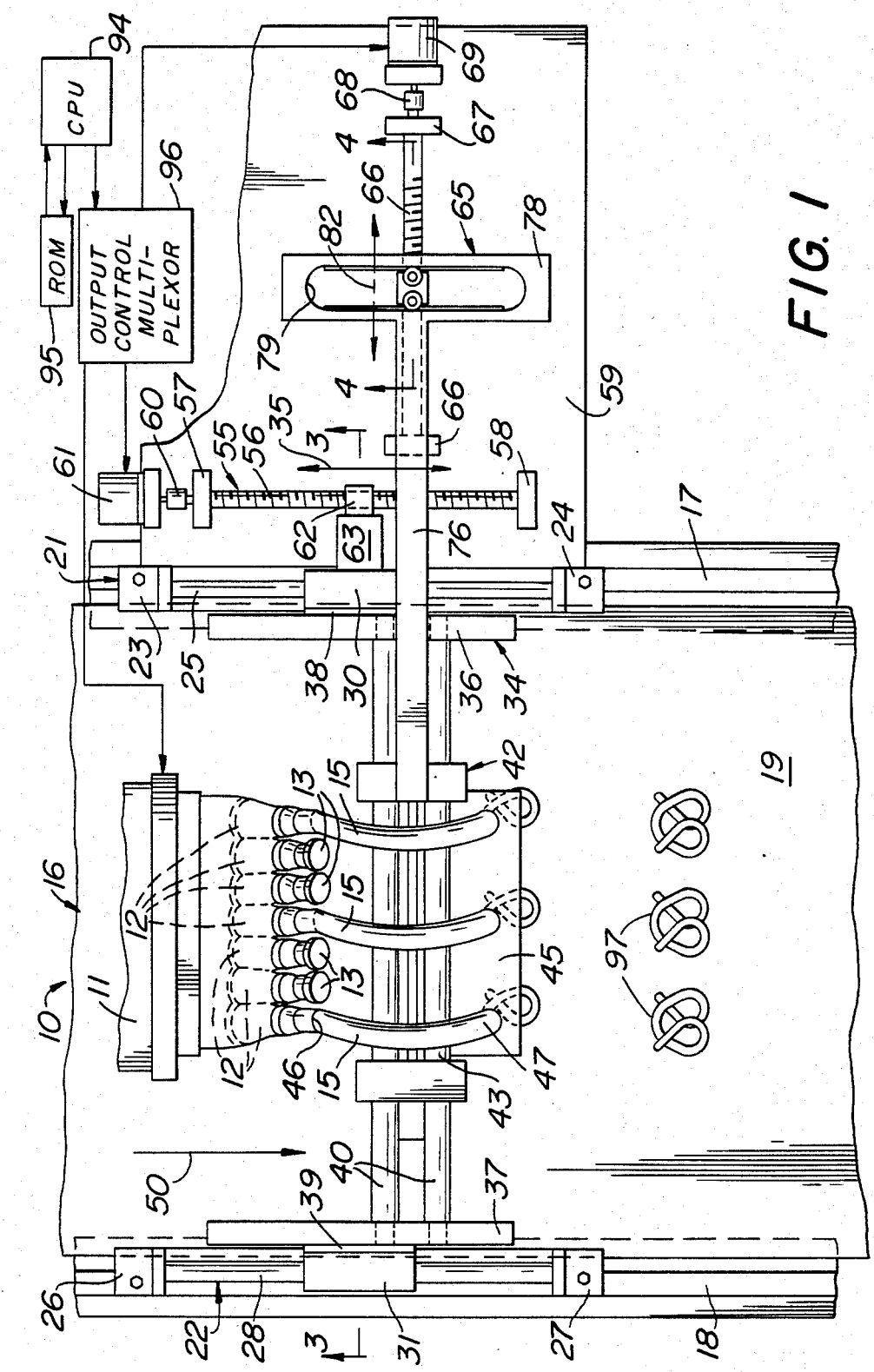
FIG. 1 is a top plan view illustrating apparatus of the present invention in an operative condition.

Referring now more particularly to the drawings, and specifically to FIG. 1 thereof, the food processing apparatus therein is generally designated 10, and may include an extruder or extruder head 11. The extruder 11 may, of itself, be conventional, say the screw type or other, and suitably fixedly positioned by suitable support means (not shown). The extruder head 11 may include a plurality of outlet or discharge members 12, which may be arranged in a row, in side by side relation, with respect to each other, as illustrated, or otherwise. In the illustrated embodiment certain of the discharge members 12 are in non-use condition, being closed or plugged, as by closures 13.

The remaining extruder discharge members or outlets 12, being illustrated as three in number, are provided with respective elongate flexible conduits or nozzles 15.

Located under the nozzles 15 is an extrudate receiver, generally designated 16, which may be an upwardly facing web or belt type conveyor. The conveyor or receiver 16 may include fixed side members 17 and 18 extending in general parallelism with each other on opposite sides of the extruder 11, and extending longitudinally of and between the side pieces 17 and 18 may be the upper run of a generally horizontal, longitudinally moving belt or web 19. Thus, the web or belt 19 of receiver 16 extends under the extruder nozzles 15.

Fixed to the conveyor side members 17 and 18, respectively extending longitudinally thereof, are a pair of opposed rail assemblies or ways 21 and 22 extending longitudinally along and over the respective side member. In particular, the rail assembly 21 may include a pair of brackets 23 and 24 seated on and upstanding from side member 17 at spaced locations therealong, and a rod or way member 25 may extend generally horizontally between respective brackets 23 and 24, being fixedly supported thereby longitudinally and along one side of the conveyor belt 19. The other rail assembly or way 22 similarly includes a pair of longitudinally spaced brackets 26 and 27 suitably secured on the conveyor side member 18 at longitudinally spaced locations therealong, and upstanding therefrom to support a longitudinally extending, generally horizontal way member or rod 28 extending longitudinally and along one side of the conveyor belt 19 opposite to the rod 25.

Slidable longitudinally on the way members 25 and 28 are respective slides 30 and 31, which may be tubular and cylindrical, as illustrated. A trolley or longitudinal carrier is generally designated 34, and extends rigidly between the slides 30 and 31 for back and forth movement longitudinally of and over the belt 19, as in the directions of arrows 35.

The longitudinal trolley or carrier 34 may include a pair of generally parallel, spaced, facing plates 36 and 37 respectively rigidly fixed to slides 30 and 31, as by spacers or shims 38 and 39. Extending transversely across and spaced over the conveyor belt or web 19, rigidly connecting the plates 36 and 37 are a pair of generally horizontal, parallel rods or ways 40 extending transversely across the conveyor belt 19. Thus, the longitudinally movable trolley 34 is composed of the rigidly connected plates 36 and 37, and the ways or rods 40, mounted as a unit by the slides 30 and 31 on the way members 25 and 28 for reciprocatory longitudinal movement relative to the conveyor belt.

Mounted on the longitudinal trolley 34 for movement therewith and movement relative thereto transversely of the conveyor belt 19 is a transverse trolley or carrier 42. The transverse trolley may include a generally horizontal plate 43 spaced below the rods 40, and provided with a pair of spaced, upstanding lugs or bosses 44 each suitably bored and journaled for slidably receiving both of the way members 40. Thus, the transverse trolley 42 is mounted on the rods 40 of longitudinal trolley 34 to enable the transverse trolley to reciprocate transversely of the conveyor belt 19.

Extending from the transverse trolley 42, and specifically from the plate 43 may be a mounting member or plate 45. The plate 45 is generally horizontal and elongate in the direction transversely of the conveyor belt 19. Similarly the bank of extruder discharge elements 12 is arranged in a row transversely of the conveyor belt 19, generally parallel to the plate 45. The nozzles or flexible conduits each extends from a fluid communicable connection at one end, upstream of the conveyor belt movement, as at 46, to its opposite or downstream end 47, which is suitably connected to the plate 45. An outlet or orifice fitting 48 may be carried on the downstream end of each nozzle 47, depending below the plate 45 and opening downwardly toward the upper side of conveyor belt 19. The several outlets or orifice fittings 48 are thus arranged in a row transverly of the conveyor belt. Each outlet or orifice fitting 48 may be provided with a valve 49, say a remotely electrically operable adjustably variable valve, or other suitable closure.

It will now be appreciated that the plate 45, and the nozzle orifices or outlets 48 carried by the plate are mounted for selected motion in two dimensions, as in the longitudinal dimension of way members 25 and 28, and the transverse dimension of way members 40. In addition to this two dimensional motion of way members and their slides, the conveyor belt by its longitudinal movement in the direction of arrow 50, may augment or substitute for the longitudinal movement of the trolley 34. If desired, a third dimension of movement may be employed, to effect movement of the orifices 48 toward and away from the conveyor belt 19. This may effect cross-sectional variation or separation of the extrudate, as an augmentation or substitute for the valves 49.

A longitudinal trolley drive means is generally designated 55, and may include an axially rotatable lead screw 56 extending longitudinally along the rail or way member 25, outward of the conveyor 16. The lead screw 56 is rotatably supported at opposite ends by upstanding journal posts or pedestal bearings 57 and 58, which may be fixed on a mounting plate or table 59 extending laterally outwardly from the conveyor side rail 17. Connected in driving relation to one end of the lead screw 56, as by a coupling 60, is a prime mover 61, such as a stepping motor, or other suitable drive device.

Circumposed about and in threaded engagement with the lead screw 56 is a nut or follower 62, which is rigidly connected by a bar 63 to the slide 30. Thus, upon rotation in opposite directions of the lead screw 56, the nut 62 is caused to move in opposite directions along the lead screw and effect like movement of the trolley 42 longitudinally of the conveyor 16.

A transverse trolley drive is generally designated 65, and includes an axially rotatable lead or feed screw 66 extending transversely of the receiver or conveyor 16 and supported at its opposite ends for rotation by upstanding journal posts or pedestal bearings 66 and 67. The journal pedestals 66 and 67 may be located outward of the longitudinal feed screw 56 and upstand to an elevation greater than that of the journal posts 57 and 58.

Beyond the outer journal post 67, as at 68, the screw 66 may be coupled to a suitable prime mover or drive 69, such as a stepping motor.

Figure 4:
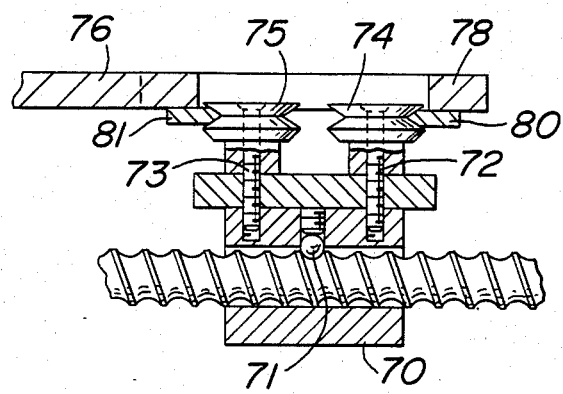
FIG. 4 is a partial sectional elevational view taken generally along the line 4—4 of FIG. 1.
Figure 5:
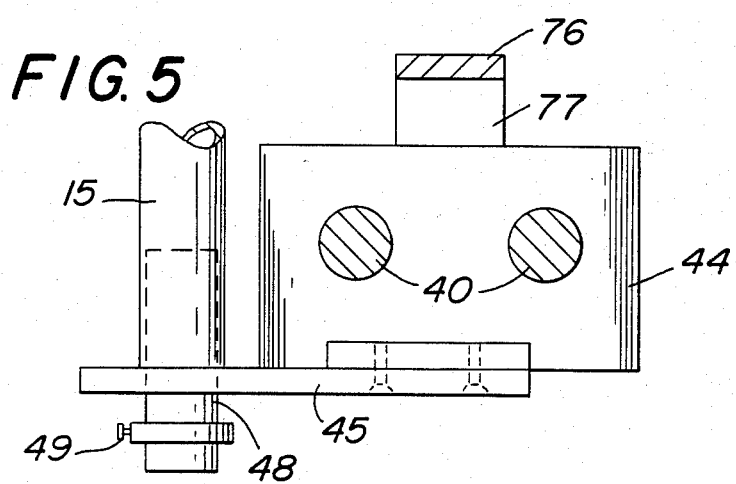
FIG. 5 is a sectional elevational view taken generally along the line 5—5 of FIG. 2.

A screw follower block or nut 70 is circumposed about the screw 66 in threaded engagement therewith, as by a ball 71, best seen in FIG. 4. Upstanding from the screw follower block or nut 70 are a pair of shafts 72 and 73, respectively rotatably carrying generally horizontally disposed grooved rollers 74 and 75.

A rigid connector or bar 76 is fixed at one end to the transverse trolley 42, say being fixed by a block 77 to the top of one lug 44 and extending laterally therefrom over and beyond the plate 36, longitudinal drive 55 and the lead screw 66 to terminate in an enlarged head 78 over the screw follower 70. The head 78 is formed with a through opening or cut-out 79 extending generally normal to the direction of lead screw 66, and provided with parallel guide members or rails 80 and 81 in respective guiding engagement with rollers 74 and 75. Thus, the rails 80 and 81 are fixed to the head 78 and enable the head to move transversely of the lead screw 66 with the trolley 42 upon movement of the latter longitudinally of the receiver belt 19. However, the guided relation of follower block or nut 70 with respect to the connector head 78 constrains the connector bar 76 and trolley 42 to transverse movement with the follower block upon rotation of the lead screw 66. The lead screw 66 therefore is operative to effect back and forth movement of the trolley 42 transversely of the conveyor 16, as in the directions of arrow 82. Thus, upon simultaneous operation of drive motors 61 and 69 to rotate lead screws 56 and 66, the longitudinal trolley 34 and the transverse trolley 42 are both, simultaneously moved on their mounting means relative to the conveyor belt 19 to define a desired path of relative movement.

Figure 6:
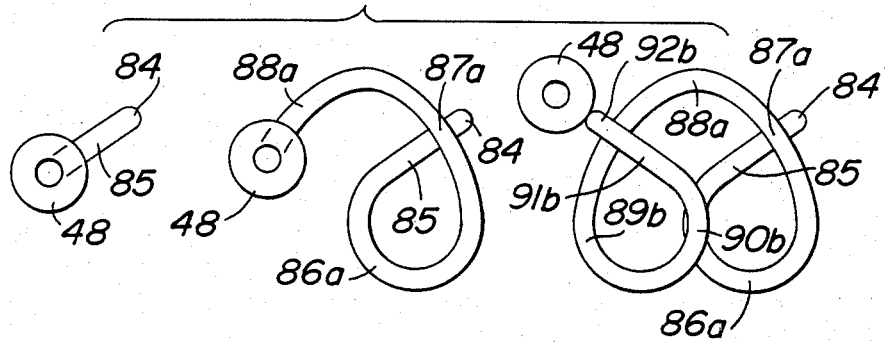
FIG. 6 is a sequence of time spaced representations of a food product being extruded in practice of the instant invention.

One such path of relative movement is sequentially illustrated in FIG. 6, a nozzle orifice 48 being shown in the earlymost, left hand diagram as having deposited a dough strand 85 having been initiated at an end 84.

In the next illustrated condition (rightward in FIG. 6), the nozzle orifice 48 has effected movement relative to the conveyor or receiver to extend the dough strand along an arcuate path 86a which crosses over the initial end 84 at 87a and continues in an arc 88a of increasing radius.

The final sequence illustrates the dough strand as continuing at 89b in an arc of decreasing radius, to overlap at 90b the arc of 86a, and then to extend in a terminal, generally straight portion 91b to an end portion 92b, at which the orifice 48 may be closed by its valve. It will be apparent that this configuration defines that of a conventional pretzel. Of course, many other line configurations may be produced, as desired.

Referring again to FIG. 1, it will be seen that a central processor unit 94 is connected to a memory 95 for receiving information from the memory. The received information is processed and directed through an output control 96 to the drive motors 61 and 69, and to the nozzle valves 49. By this means, the memory information is imparted to the processor for operating the drive and valve means to produce the pretzels 97 or other articles of preselected two dimensional line configuration. That is, the information delivered by the memory 95 to the processor 94 controls the synchronous operation of drives 61 and 69, and valves 49 to produce the desired product configuration. Of course, the procedure is repetitive, if desired; and, in accordance with the memory information the product configuration may be changed as and when desired. Indeed, the processor 94 may be connected to a manual computer terminal for manual operation to produce unique or one-of-a-kind configurations.

From the foregoing, it is seen that the present invention provides a food processing apparatus which is extremely versatile, capable of being highly automatic, relatively simple in construction for economy in manufacture and maintenance, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A food processing apparatus comprising an extruder having an outlet, a nozzle connected to said outlet for discharging extrudate, an extrudate receiver located to receive extrudate from said nozzle, mounting means mounting said nozzle and receiver for universal relative motion in two axes to discharge extrudate in any preselected configuration on said receiver positioning means in driving relation with said mounting means for selectively effecting said universal relative motion. programmable controller means for selectively and variably controlling said positioning means to effect continuous or discontinuous relative motion of said mounting means.

2. A food processing apparatus according to claim 1, in combination with a valve associated with said nozzle for selectively starting and stopping extrudate, and valve operating means synchronized with said controller means for opening and closing said valve in selected relation with said relative motion.

3. A food processing apparatus according to claim 1, said nozzle comprising a flexible conduit having one end communicating with said extruder outlet, and an orifice on the other end of said conduit for discharging extrudate, said mounting means mounting said orifice for said relative motion.

4. A food processing apparatus according to claim 1, in combination with an additional nozzle communicating with said outlet for discharging an additional stream of extrudate to said receiver, said mounting means mounting said first mentioned and additional nozzles for discharging plural extrudate streams in a preselected configuration on said receiver.

5. A food processing apparatus according to claim 3, said receiver comprising a conveyor movable along one axis of said relative motion, said controller means controlling said relative motion along said one axis to accomodate to said conveyor movement.

6. A food processing apparatus according to claim 5, in combination with a valve associated with said nozzle for selectively starting and stopping extrudate, and valve operating means synchronized with said controller means for opening and closing said valve in selected relation with said relative motion to stop extrudate upon completion of said configuration.

7. A food processing apparatus according to claim 1, said receiver comprising a generally upwardly facing conveyor, said nozzle being over and facing downwardly toward said conveyor, and said mounting means mounting said nozzle for movement longitudinally along and transversely of said conveyor, for discharging extrudate having a two dimensional preselected line configuration.

8. A food processing apparatus according to claim 7, said conveyor comprising an elongate longitudinally moving belt, said mounting means comprising a longitudinal trolley movable in opposite directions longitudinally along said belt, and a transverse trolley movable with said longitudinal trolley and relative thereto in opposite directions transversely of said belt, said nozzle being carried by said transverse trolley for longitudinal movement with said longitudinal trolley and transverse movement with said transverse trolley relative to said longitudinal trolley.

9. A food processing apparatus according to claim 8, said positioning means comprising longitudinal and transverse drive means respectively in driving relation with said longitudinal and transverse trolleys, and said controller mean comprising a data processor operatively connected in controlling relation with said longitudinal and transverse drive means, and a memory connected to said processor for imparting information to said processor for operating said drive means to produce said preselected configuration of extrudate on said receiver.

10. A food processing apparatus according to claim 9, in combination with longitudinal way means fixed along said conveyor and supporting said longitudinal trolley for longitudinal movement, and transverse way means fixed on said longitudinal trolley and supporting said transverse trolley for transverse movement relative to said longitudinal trolley.

11. A food processing apparatus according to claim 10, said longitudinal drive means comprising a longitudinally extending rotary lead screw operatively connected to said longitudinal trolley, a longitudinal drive motor connected in driving relation with said longitudinally extending lead screw, a transversely extending rotary lead screw operatively connected to said transverse trolley, and a transverse drive motor connected in driving relation with said transversely extending lead screw, said longitudinal and transverse drive motors being electrically connected to said data processor for control thereby.

12. A food processing apparatus according to claim 11, in combination with a valve associated with said nozzle for selectively starting and stopping extrudate, and valve operating means electrically connected to said data processor for opening and closing said valve in selected relation with nozzle movement to stop extrudate upon completion of said configuration.

13. A food processing apparatus according to claim 1, in combination with a discharge orifice on said nozzle for passing extrudate, and a closure valve at said discharge orifice for selectively starting and stopping extrudate upon opening and closing for terminating extrudate flow at the discharge orifice, said receiver comprising a generally upwardly facing conveyor moveable in the direction of one dimension of said relative motion, said conveyor being under and closely beneath said nozzle, whereby said valve upon closure severs extrudate proximate to said receiver for accurately terminating the extrudate configuration.

* * * * *